(12) United States Patent
Lim et al.

(10) Patent No.: US 7,525,617 B2
(45) Date of Patent: Apr. 28, 2009

(54) LIQUID CRYSTAL DISPLAY DEVICE AND METHOD FOR FABRICATING THE SAME

(75) Inventors: Ji Chul Lim, Gyeongsangbuk-Do (KR); Youn Seung Choi, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 318 days.

(21) Appl. No.: 11/474,979

(22) Filed: Jun. 27, 2006

(65) Prior Publication Data

US 2007/0153180 A1    Jul. 5, 2007

(30) Foreign Application Priority Data

Dec. 29, 2005    (KR) .................. 10-2005-0134386

(51) Int. Cl.
*G02F 1/1333* (2006.01)
(52) U.S. Cl. ..................................... 349/122
(58) Field of Classification Search ........................ None
See application file for complete search history.

(56) References Cited

U.S. PATENT DOCUMENTS 5,646,705 A * 7/1997 Higuchi et al. .............. 349/143

\* cited by examiner

*Primary Examiner*—Sung H Pak
(74) *Attorney, Agent, or Firm*—McKenna Long & Aldridge LLP

(57) ABSTRACT

A method for fabricating a liquid crystal display (LCD) device includes forming a gate electrode and a common electrode line on a first substrate; forming a first insulating layer on the gate electrode; forming an active layer and source/drain electrodes on the first insulating layer; forming a second insulating layer on the source/drain electrodes; forming a photosensitive layer on the second insulating layer; forming a first contact hole, a second contact hole, a first trench and a second trench in the second insulating layer; forming a conductive layer on the photosensitive layer and in the first and second contact holes and the first and second trenches; lifting-off the photosensitive layer to form a pixel electrode electrically connected to the drain electrode through the first contact hole in the first trench and a common electrode electrically connected to the common electrode line through the second contact hole in the second trench; and attaching the first substrate to a second substrate.

15 Claims, 8 Drawing Sheets

LIQUID CRYSTAL DISPLAY DEVICE AND METHOD FOR FABRICATING THE SAME

This application claims the benefit of Korean Patent Application No. 2005-134386, filed on Dec. 29, 2005, which is hereby incorporated by reference for all purposes as if fully set forth herein.

BACKGROUND OF THE INVENTION

1. Field of the Invention

The present invention relates to a display device, and more particularly, to a liquid crystal display (LCD) device and method for fabricating the same that can improve an image quality.

2. Discussion of the Related Art

As demands for portable information devices increase, thin and light flat panel displays (FPDs) are being researched and commercialized and are replacing the conventional cathode ray tubes (CRTs). Liquid crystal display (LCD) devices of the FPDs display images by using an optical anisotropy of liquid crystal molecules. LCD devices are applied to notebooks, desk-top monitors, etc. due to their excellent resolution, color display, picture quality, etc.

A twisted nematic (TN) mode is generally used to drive liquid crystal molecules in a perpendicular direction to the substrates of LCD devices. However, the TN method has a narrow viewing angle of about 90° due to the refractive anisotropy of liquid crystal molecules. That is, because the liquid crystal molecules arranged in a horizontal direction to the substrates are realigned in a vertical direction to the substrates when a voltage is applied, the TN mode LCD devices have a narrow viewing angle.

Accordingly, in plane switching (IPS)-LCD devices have been introduced that have a viewing angle of more than 170° in which the liquid crystal molecules rotate in a horizontal direction of the substrates.

FIG. 1 is a plan view illustrating an array substrate of an IPS-LCD device according to the related art, and FIG. 2 is a cross-sectional view taken along the line I-I' in FIG. 1.

Referring to FIGS. 1 and 2, the LCD device includes N gate lines 16 and M data lines 17 on an array substrate 10 crossing one another to construct M×N pixels. The LCD device further includes a thin film transistor (TFT) 20 formed adjacent to each crossing of the gate lines 16 and the data lines 17. In the drawings, only one pixel is illustrated for convenience of description.

The TFT 20 includes a gate electrode 21 connected to the gate line 16, a source electrode 22 connected to the data line 17 and a drain electrode 23 connected to a pixel electrode line 18L. The TFT 20 further includes a first insulating layer 15A for insulating the gate electrode 21, the source electrode 22, the drain electrode 23 and an active layer 24 for forming a conductive channel between the source electrode 22 and the drain electrode 23 by a gate voltage applied to the gate electrode 21; and an ohmic-contact layer 25 for ohmic-contacting between the source/drain electrodes 22 and 23 and the active layer 24.

Common electrodes 8 and pixel electrodes 18 are alternately arranged in the pixel region in a direction parallel with the data line 17 for generating a horizontal electric field. The pixel electrodes 18 are electrically connected to the pixel electrode line 18L connected to the drain electrode 23 through a first contact hole 40A formed in a second insulating layer 15B. Also, the common electrodes 8 are electrically connected to a common electrode line 8L arranged in parallel with the gate line 16 through a second contact hole 40B. The common electrodes 8 and the pixel electrodes 18 are formed of a transparent conductive material.

In the LCD device according to the related art, due to their heights, the common and pixel electrodes 8 and 18 protrude from the surface of the second insulating layer 15B that causes a scratch on a surface of an alignment layer during a rubbing process.

More particularly, the rubbing process aligns the molecules of an alignment layer in a desired direction by rotating a roll having a rubbing cloth in a certain direction. When such a protrusion exists below the alignment layer, the rubbing cloth is caught by the protrusion during the rubbing process and the surface of the alignment layer is scratched.

An alignment degree of the scratched portion of the alignment layer is inferior to an alignment degree of other portions of the alignment layer, so that the liquid crystal molecules on the scratched portion may not be aligned in a desired direction. As a result, such a rubbing scratch on the alignment layer decreases the contrast ratio of the LCD device and may be seen as a line defect on the LCD screen.

SUMMARY OF THE INVENTION

Accordingly, the present invention is directed to an LCD device and method for fabricating the same that substantially obviates one or more of the problems due to limitations and disadvantages of the related art.

An advantage of the present invention is to provide is to provide an LCD device method for fabricating the same that can improve an image quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a liquid crystal display (LCD) device, comprising: providing a first substrate and a second substrate; forming a gate electrode, a gate electrode line and a common electrode line on a first substrate; forming a first insulating layer on the gate electrode; forming an active layer and source/drain electrodes on the first insulating layer; forming a second insulating layer on the source/drain electrodes; forming a plurality of trench patterns in the second insulating layer over the first substrate; forming a liquid crystal layer between the first and second substrates; and attaching the first substrate to the second substrate.

In another aspect of the present invention, a liquid crystal display (LCD) device includes: a first substrate and a second substrate; a gate electrode, a gate electrode line and a common electrode line formed on the first substrate; a first insulating layer on the gate electrode; an active layer and source/drain electrodes over the gate electrode; a second insulating layer formed over the first substrate; a plurality of trench patterns formed in the second insulating layer; a pixel electrode and a common electrode in the plurality of trench patterns; and a liquid crystal layer formed between the first and second substrates.

In yet another aspect of the present invention, a method for fabricating a liquid crystal display (LCD) device includes forming a gate electrode on a substrate; forming a first insulating layer on the gate electrode; forming an active layer on the first insulating layer; forming source/drain electrodes on the active layer; forming a second insulating layer on the source/drain electrodes; forming a photosensitive layer on the second insulating layer; forming a trench in the second insulating layer; forming a conductive layer in the trench; and lifting-off the photosensitive layer to form a pixel electrode in the trench.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
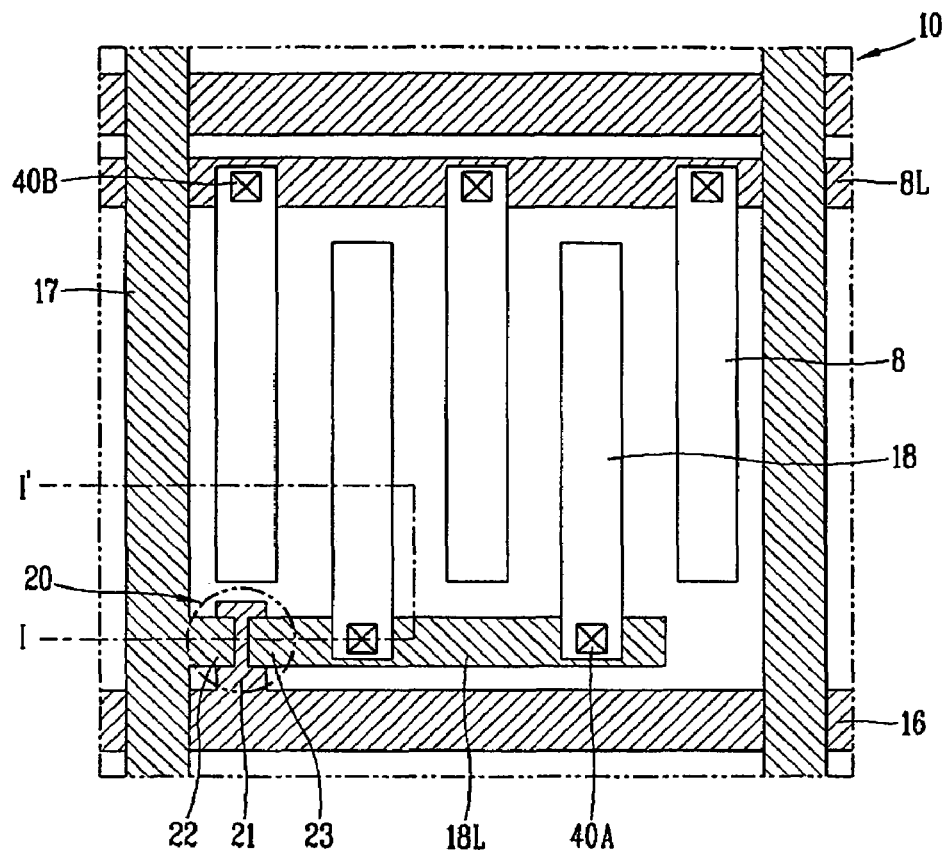
FIG. 1 is a plan view illustrating an array substrate of an IPS-LCD device according to the related art.
Figure 2:
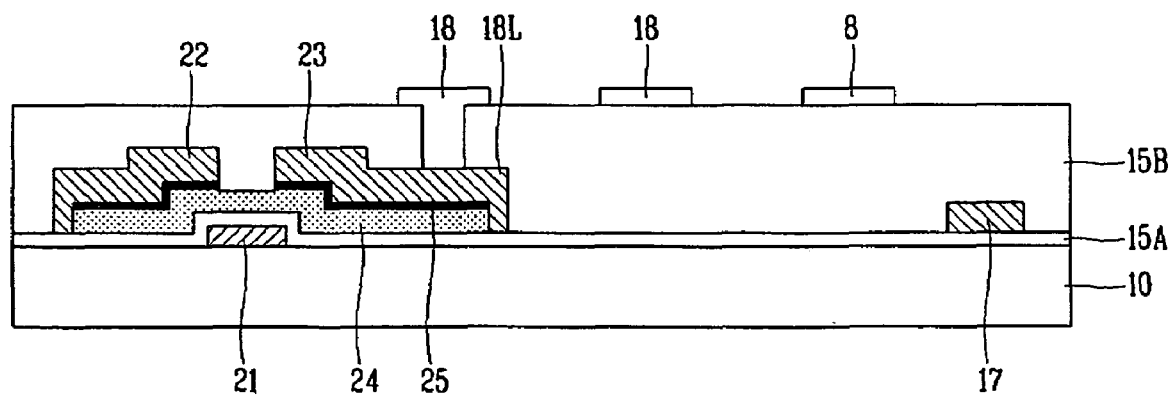
FIG. 2 is a cross-sectional view taken along the line I-I' in FIG. 1.
Figure 3:
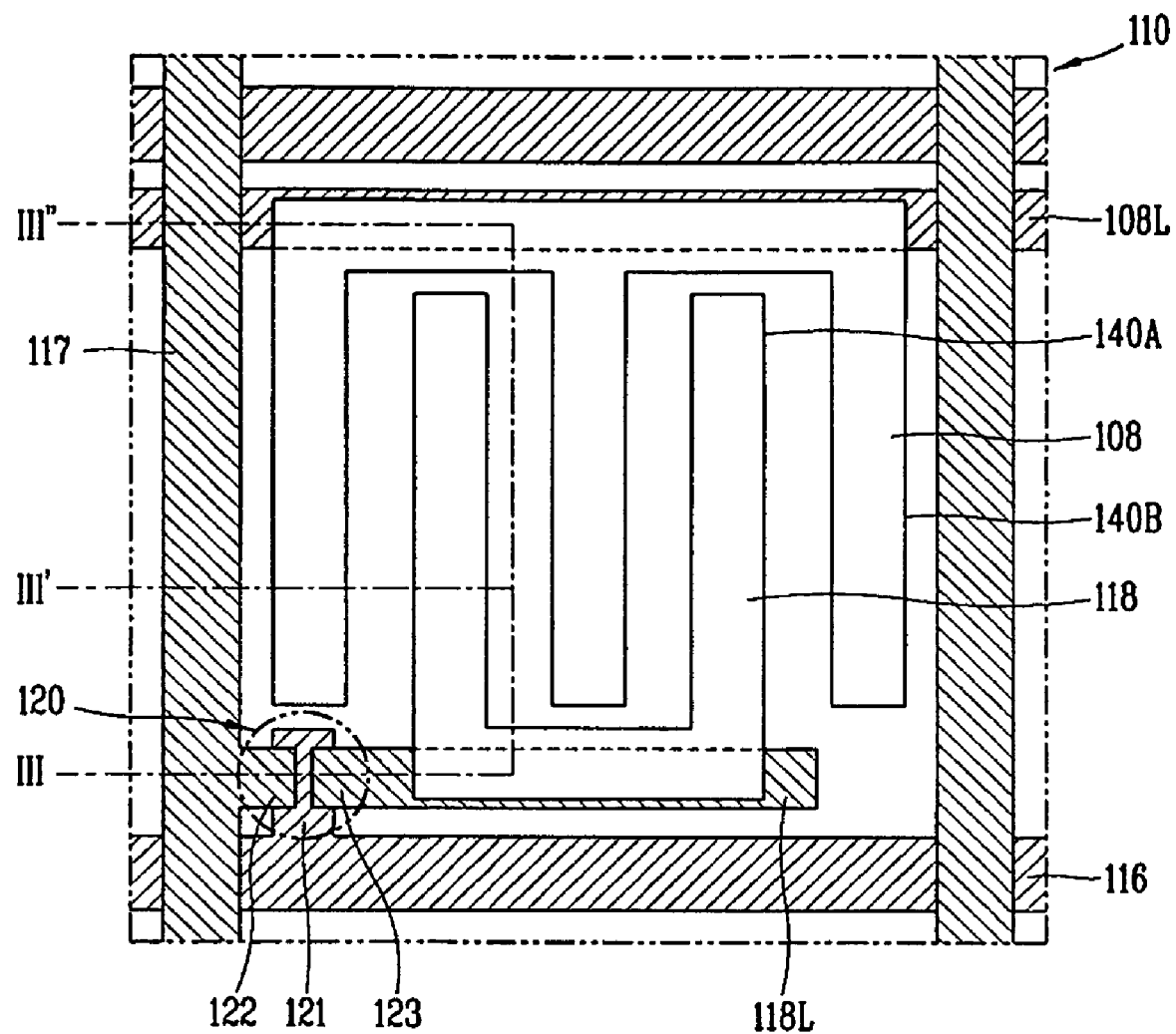
FIG. 3 is a plan view illustrating an array substrate of an IPS-LCD device according to the present invention.

A liquid crystal display (LCD) device and method for fabricating the LCD device according to the present invention will now be explained with reference to the attached drawings. FIG. 3 is a plan view illustrating an array substrate of an IPS-LCD device according to the present invention, and FIGS. 4A and 4B are a cross-sectional view taken along the line III-III' and III-III" in FIG. 3.

Figure 4A:
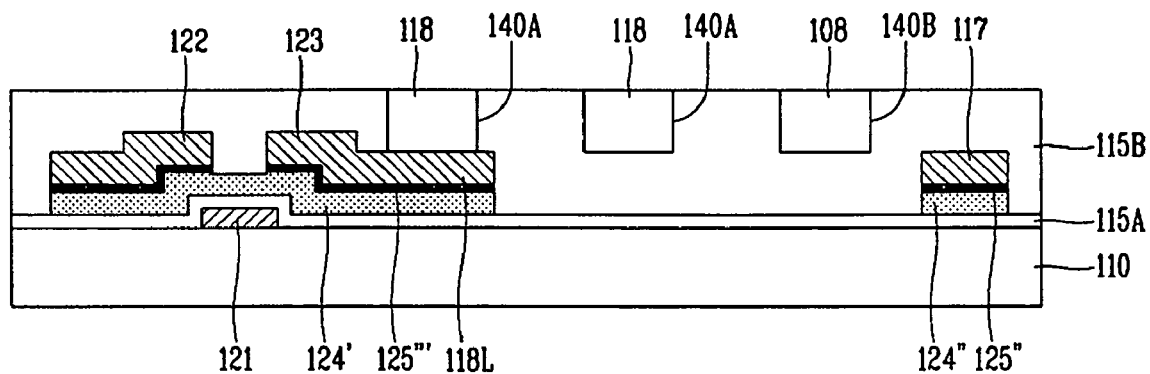
FIG. 4A is a cross-sectional view taken along the line III-III' in FIG. 3.
Figure 4B:
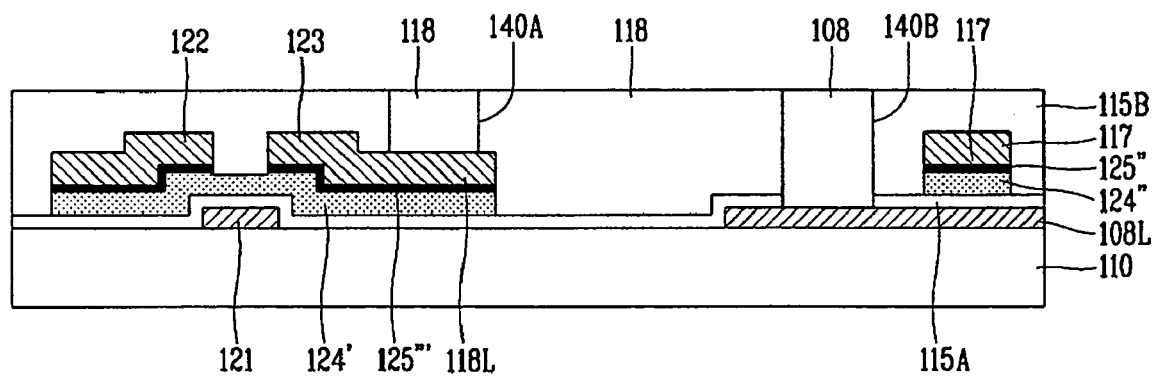
FIG. 4B is a cross-sectional view taken along line III-III" in FIG. 3.

Referring to FIGS. 3, 4A and 4B, the LCD device includes N gate lines 116 and M data lines 117 on an array substrate 110 crossing one another to construct M×N pixels. The LCD device further includes a thin film transistor (TFT) 120 formed adjacent to each crossing of the gate lines 116 and the data lines 117.

In the drawings, only one pixel is illustrated for convenience of description. Also, although an IPS-LCD device is illustrated in the drawings, it should be understood that the principles of the present invention can be applied to a fringe field switching (FFS)-LCD device that drives liquid crystal molecules with a fringe field, a horizontal electric field having a parabolic shape.

The TFT 120 includes a gate electrode 121 connected to the gate line 116, a source electrode 122 connected to the data line 117 and a drain electrode 123 connected to a pixel electrode 118 through a pixel electrode line 118L. The TFT 120 further includes a first insulating layer 115A for insulating the gate electrode 121, the source electrode 122, the drain electrode 123 and an active layer 124' for forming a conductive channel between the source electrode 122 and the drain electrode 123 by a gate voltage applied to the gate electrode 121.

Common electrodes 108 and pixel electrodes 118 are alternately arranged in the pixel region for generating a horizontal electric field. The pixel electrodes 118 are electrically connected to the pixel electrode line 118L through a first trench pattern 140A, and the common electrodes 108 are electrically connected to a common electrode line 108L arranged in parallel with the gate line 116 through a second trench pattern 140B. In this embodiment, the common electrode 108 and the pixel electrode 118 are formed of a transparent conductive material such as indium tin oxide (ITO). However, the principles of the present invention can also be applied to an IPS-LCD device in which only one of the common electrode 108 and the pixel electrode 118 is formed of a transparent conductive material, or in which the common electrode 108 and the pixel electrode 118 are arranged in a zigzag form (or a herringbone form).

As shown in FIGS. 4A and 4B, the common electrode 108 and the pixel electrode 118 are formed in the first and second trench patterns 140A and 140B of the second insulating layer 115B by a lift-off process at the time of patterning the second insulating layer 115B. As a result, there is no protrusions on a surface of the second insulating layer 115B, which will be explained in more detail with reference to FIGS. 5A to 5C.

Figure 5A:
FIGS. 5A to 5C are cross-sectional views illustrating a fabrication process of the array substrate of FIG. 4.
Figure 5B:
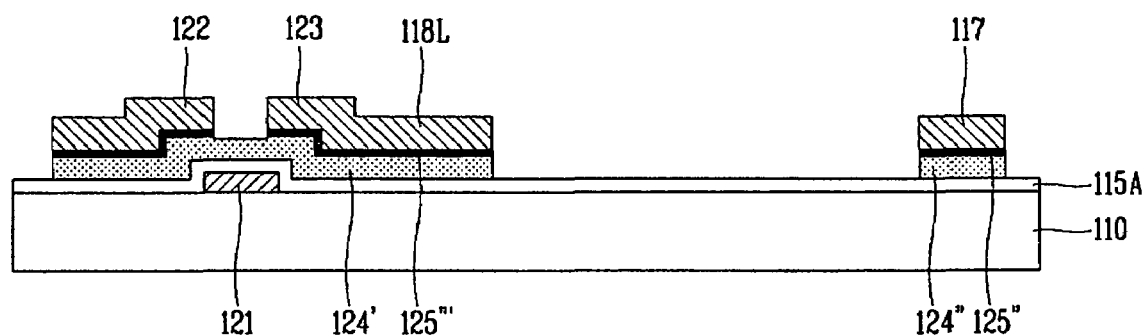
Figure 5C:
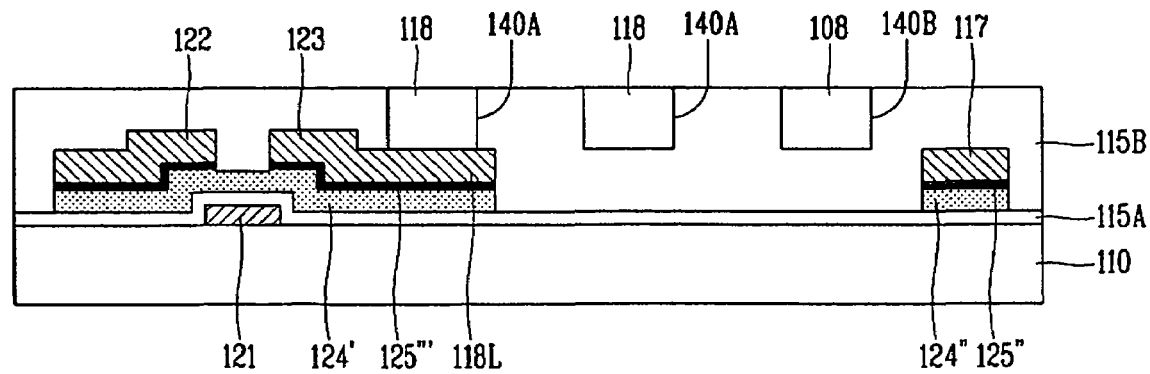

FIGS. 5A to 5C are cross-sectional views illustrating a fabrication process of the array substrate of FIGS. 4A and 4B. In this embodiment, an array substrate of an IPS-LCD device is formed by a three mask process (i.e. three photolithography process). However, the principles of the present invention can be applied to an LCD device and method for fabricating the same, irrespective of the number of mask process.

Referring to FIG. 5A, a gate electrode 121, a gate line (not shown) and a common electrode line (not shown) are formed on a substrate 110 formed of a transparent insulating material. The gate electrode 121, the gate line and the common electrode line are formed by forming a first conductive layer on an entire surface of the substrate 110 and then patterning the first conductive layer by a photolithography process (a first mask process).

The first conductive layer includes an opaque conductive material having a low resistance such as aluminum (Al), aluminum alloy (Al alloy), tungsten (W), copper (Cu), chromium (Cr), molybdenum (Mo), etc. The gate electrode 121, the gate line and the common electrode line may also have a multi-layered structure formed of at least two of the above materials.

Referring to FIG 5B, a first insulating layer 115A, an amorphous silicon thin film, an n+ amorphous silicon thin film and a second conductive layer are sequentially deposited on an entire surface of the substrate 110 where the gate electrode 121, the gate line and the common electrode line are formed. Then, the amorphous silicon thin film, the n+ amorphous silicon thin film and the second conductive layer are selectively patterned by a photolithography process (a second mask process), thereby forming an active layer 124' formed of the amorphous silicon thin film and forming a source electrode 122, a drain electrode 123 and a data line 117 formed of the second conductive layer. The second mask process is performed using a diffraction exposure mask in which the active layer 124', the source/drain electrodes 122 and 123 and the data line 117 are formed with a single mask.

FIGS. 6A to 6D are cross-sectional views illustrating the second mask process of FIG. 5B in more detail.

Figure 6A:
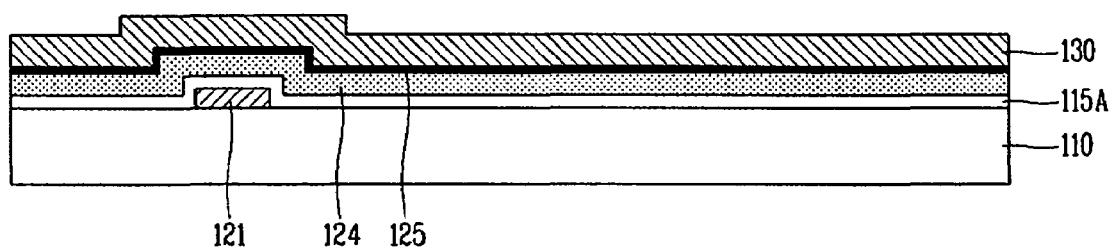
FIGS. 6A to 6D are cross-sectional views illustrating the second mask process of FIG. 5B in more detail.

Referring to FIG. 6A, a first insulating layer 115A, an amorphous silicon thin film 124, an n+ amorphous silicon thin film 125 and a second conductive layer 130 are sequentially deposited on an entire surface of the substrate 110 where the gate electrode 121, the gate line and the common electrode line are formed.

Figure 6B:
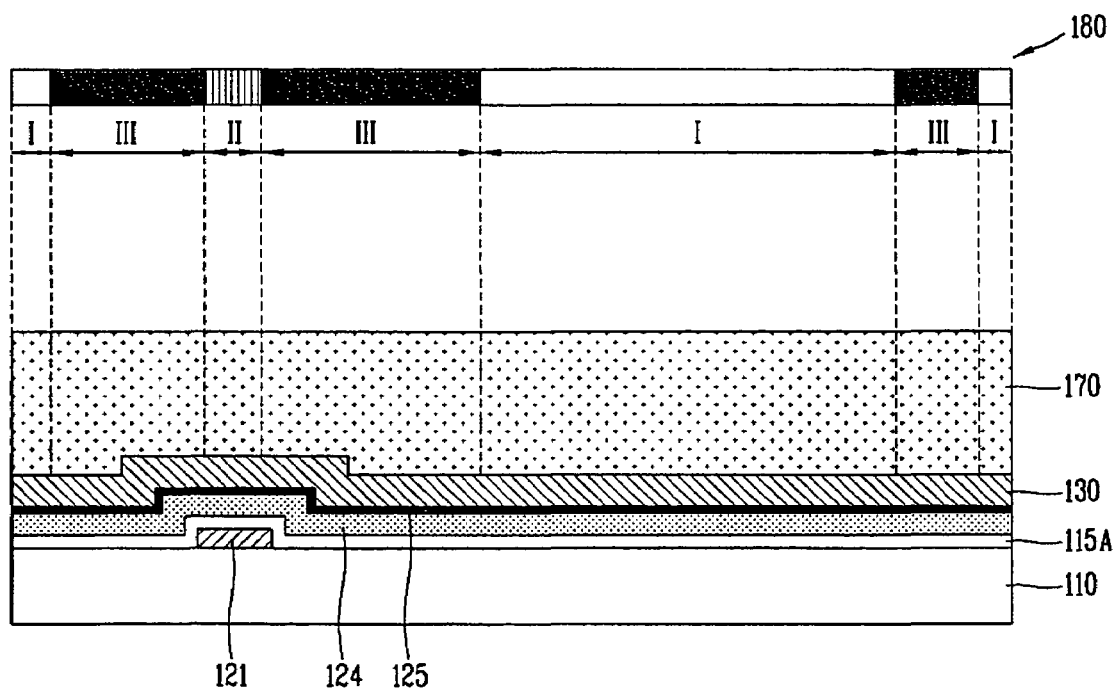

Referring to FIG. 6B, a first photosensitive film 170 formed of a photosensitive material such as photoresist is deposited on an entire surface of the substrate 110, and light is irradiated onto the first photosensitive film 170 through a diffraction exposure mask 180. The diffraction mask 180 has a first transmittance region (I) for entirely transmitting light, a second transmittance region (II) for partially transmitting light and a shielding region (III) for entirely shielding light. Light having passed through the mask 180 is irradiated onto the first photosensitive film 170.

The second transmittance region (II) of the diffraction mask 180 has a slit structure, and an amount of light that passes through the second transmittance region (II) is less than an amount of light that passes through the first transmittance region (I). As a result, a thickness of the photosensitive film corresponding to the second transmittance region (II) becomes different from a thickness of the photosensitive film corresponding to the first transmittance region (I) or the shielding region (III), after the first photosensitive film 170 deposited on the substrate 110 is exposed to light and developed.

When the first photosensitive film 170 is a positive-type photoresist, the thickness of the photosensitive film corresponding to the second transmittance region (II) is smaller than the thickness of the photosensitive film corresponding to the shielding region (III). Also, when the first photosensitive film 170 is a negative-type photoresist, the thickness of the photosensitive film corresponding to the second transmittance region (II) is greater than the thickness of the photosensitive film corresponding to the first transmittance region (I). In this embodiment, a positive-type photoresist is used. However, the principles of the present invention can also be applied to a negative-type photoresist.

Figure 6C:
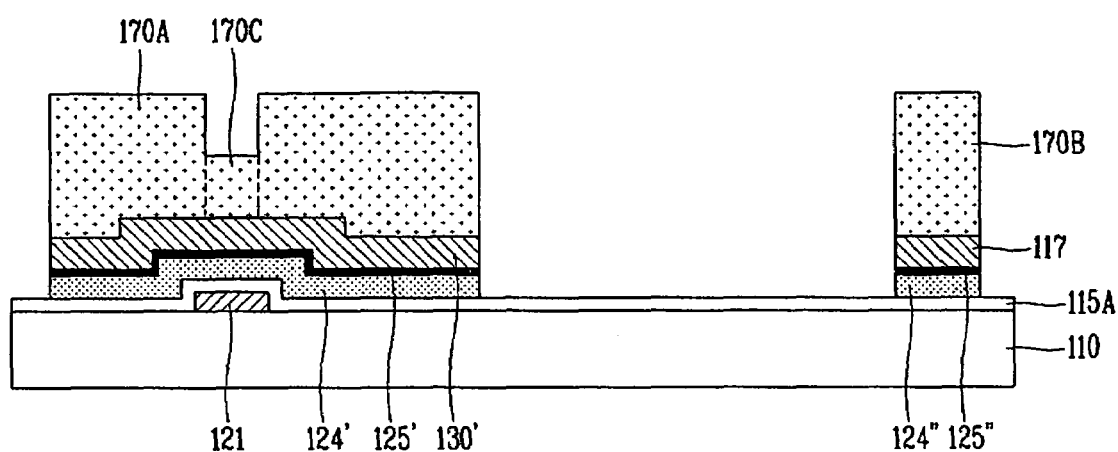

Referring to FIG. 6C, the first photosensitive film 170 exposed to light through the diffraction exposure mask 180 is then developed. A first photosensitive pattern 170A having a predetermined thickness remains at a region of the first photosensitive film 170 corresponding to the shielding region (III), and a third photosensitive pattern 170C having a predetermined thickness remains at a region of the first photosensitive film 170 corresponding to the second transmittance region (II). Also, the first photosensitive film 170 corresponding to the first transmittance region (I) is removed, thereby exposing a surface of the second conductive layer. The first photosensitive pattern 170A and the second photosensitive pattern 170B corresponding to the shielding region (III) have a thickness greater than that of the third photosensitive pattern 170C corresponding to the second transmittance region (II).

More particularly, the first photosensitive pattern 170A having a first thickness remains at source/drain regions (where source/drain electrodes will be formed by an etching process) positioned in the left side of FIG. 6C, and the second photosensitive pattern 170B having the first thickness remains at a data line region (where data lines will be formed by an etching process) positioned in the right side of FIG. 6C. Also, the third photosensitive pattern 170C having a second thickness remains at a channel region between the source region and the drain region.

Then, the amorphous silicon thin film, the n+ amorphous silicon thin film, and the second conductive layer are selectively etched using the first photosensitive pattern 170A and the third photosensitive pattern 170C as a mask, thereby forming an active layer 124' formed of the amorphous silicon thin film on the gate electrode 121 and forming the data line 117 formed of the second conductive layer at the data line region.

A first n+ amorphous silicon thin film pattern 125' formed of the n+ amorphous silicon thin film and a second conductive layer pattern 130' formed of the second conductive layer are formed on the active layer 124'. Also, a second amorphous silicon thin film pattern 124" formed of the amorphous silicon thin film and a second n+ amorphous silicon thin film pattern 125" formed of the n+ amorphous silicon thin film are formed under the data line 117.

Figure 6D:
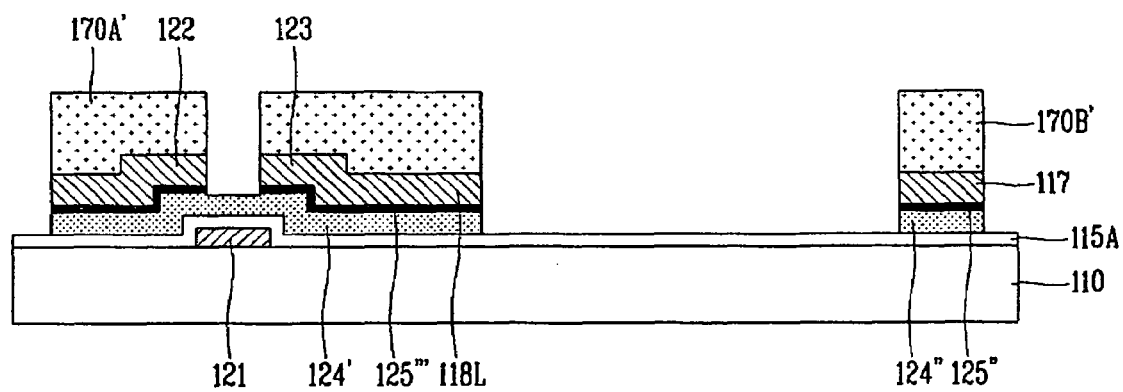

Referring to FIG. 6D, the photosensitive pattern 170C corresponding to the second transmittance region (II) is then completely removed by an ashing process. The first photosensitive pattern 170A and the second photosensitive pattern 170B corresponding to the shielding region (III) remains as a fourth photosensitive pattern 170A' and a fifth photosensitive pattern 170B', respectively, each having a third thickness. The third thickness may be substantially equal to the first thickness of the first and second photosensitive patterns 170A and 170B subtracted by the second thickness of the third photosensitive pattern 170C.

Then, the first n+ amorphous silicon thin film pattern and the second conductive layer pattern are selectively etched using the fourth photosensitive pattern 170A' and the fifth photosensitive pattern 170B' as a mask, thereby forming the source electrode 122 and the drain electrode 123 formed of the second conductive pattern on the active layer 124'. A part of the drain electrode 123 is extended and forms the pixel electrode line 118L. The first n+ amorphous silicon thin film pattern having the same shape as the source/drain electrodes 122 and 123 becomes an ohmic-contact layer 125''' for forming an ohmic-contact between the source/drain electrodes 122 and 123 and the active layer 124'.

Because the active layer 124', the source/drain electrodes 122 and 123, and the data line 117 are formed together by a single mask process using a diffraction exposure mask, the number of masks used for the fabrication process can be decreased. However, it should be understood that the principles of the present invention can also be applicable to a fabrication process in which the active layer 124' is formed by one mask process, and the source/drain electrodes 122 and 123 and the data line 117 are formed by another mask process.

Referring to FIG. 5C, a contact hole, a common electrode 108 and a pixel electrode 118 are formed by a single photolithography process (a third mask process) that includes a lift-off process.

FIGS. 7A to 7E are cross-sectional views illustrating the third mask process of FIG. 5C in more detail.

Figure 7A:
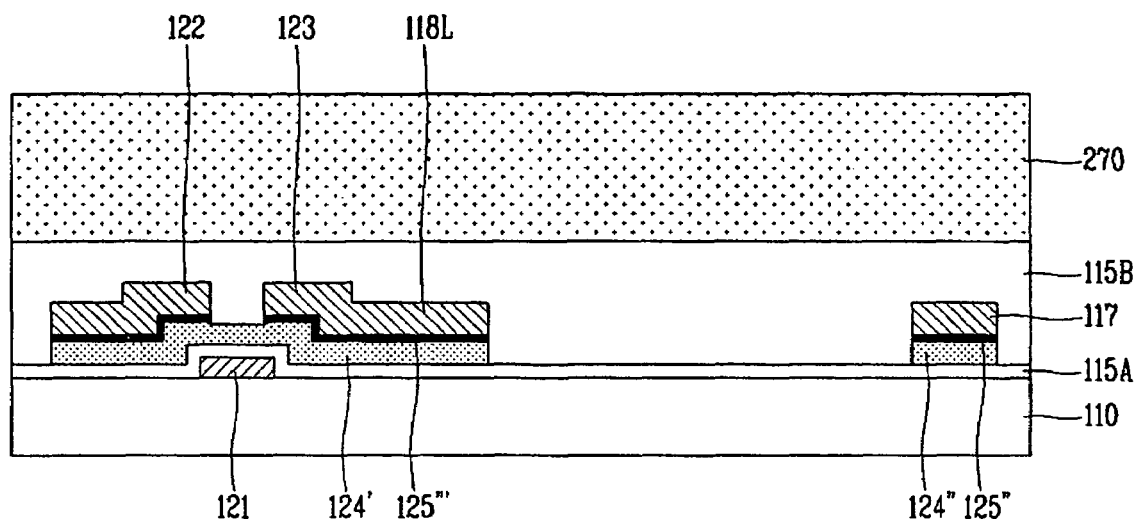
FIGS. 7A to 7E are cross-sectional views illustrating the third mask process of FIG. 5C in more detail.

Referring to FIG. 7A, a second insulating layer 115B and a second photosensitive film 270 formed of a photosensitive material such as photoresist are deposited on an entire surface of the substrate 110 where the active layer 124', the source/drain electrodes 122 and 123, and the data line 117 are formed.

Figure 7B:
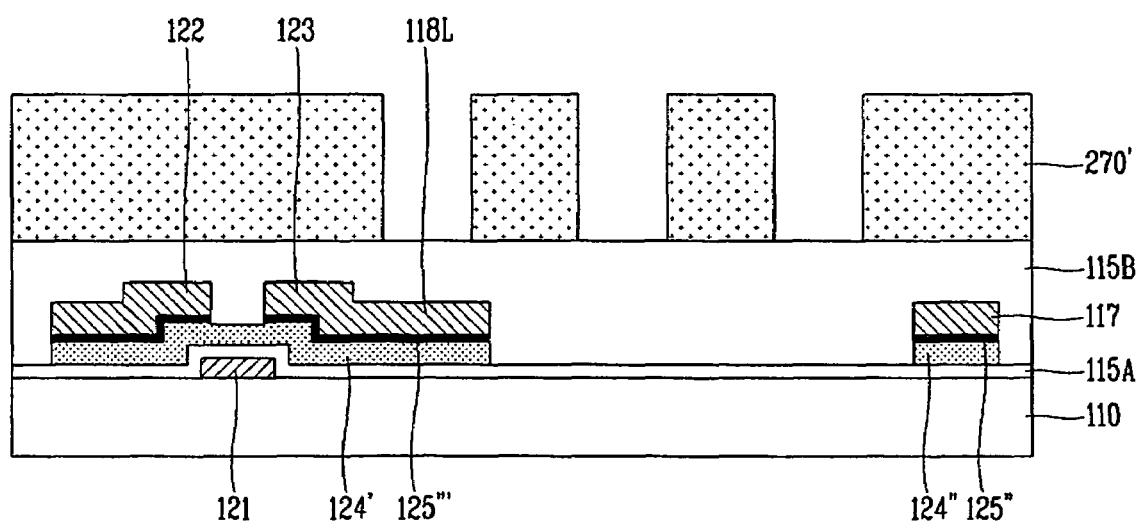
Figure 7C:
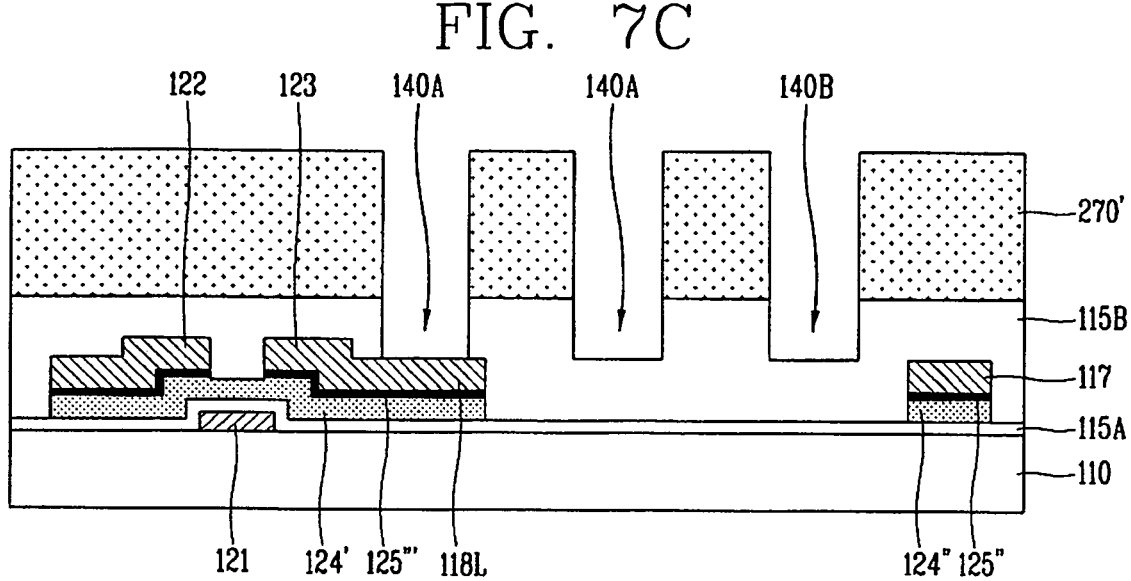

Referring to FIGS. 7B and 7C, the second photosensitive film 270 is exposed to light through a third mask and is then developed, thereby forming a second photosensitive film pattern 270'. Then, a part of the second insulating layer 115B is selectively etched using the second photosensitive film pattern 270' as a mask, thereby forming a plurality of trench patterns 140A and 140B where a common electrode and a pixel electrode are to be formed. When the trench pattern 140A is formed, a part of the drain electrode 123 is simultaneously exposed. A depth of the trench patterns 140A and 140B is less than 400Å. The thickness of the pixel electrode and common electrode is less than 400Å. Accordingly, a step between the trench patterns 140A and 140B and upper surface of the second insulating layer 115B is less than 400Å.

As shown in FIG. 4B, a trench pattern 140B for partially exposing the common electrode line is formed through the third mask process.

Figure 7D:
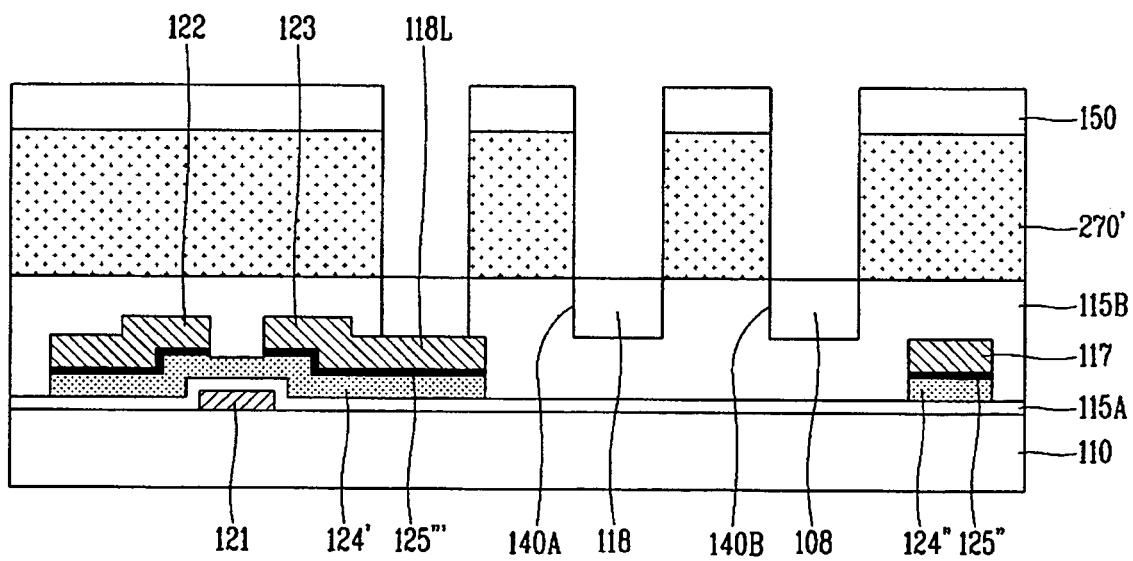

Referring to FIG. 7D, a third conductive layer 150 is formed on an entire surface of the second photosensitive film pattern 270' including the trench patterns 140A and 140B. The third conductive layer 150 may be formed of a transparent conductive material such as indium tin oxide (ITO), indium-zinc-oxide and indium-tin, zinc-oxide (ITZO).

Figure 7E:
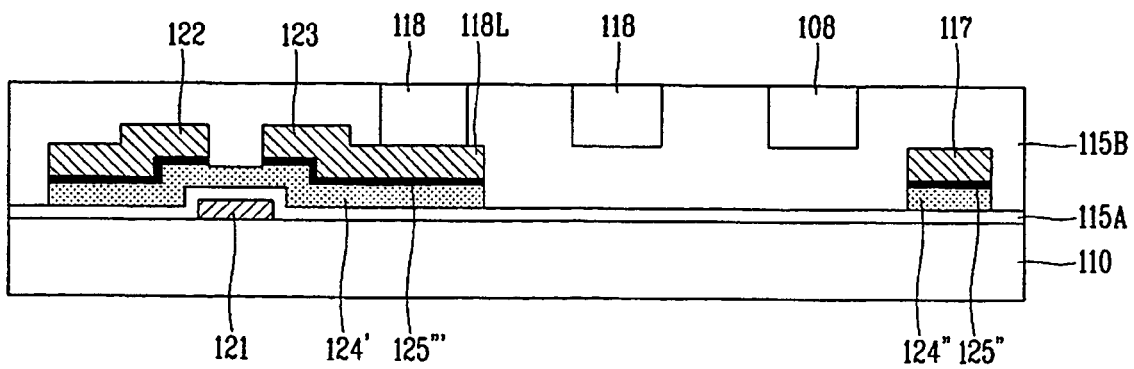

Referring to FIG. 7E, the second photosensitive film pattern 270' on which the third conductive layer is formed is removed by a lift-off process. The second photosensitive film pattern 270' and the third conductive layer formed on the second photosensitive film pattern 270' corresponding to regions other than the trench patterns 140A and 140B are removed together during the lift-off process. The third conductive layers remaining in the trench patterns 140A and 140B form the pixel electrode 118 electrically connected to the drain electrode 123 through the first trench pattern 140A and the common electrode 108 electrically connected to the common electrode line 108L through the second trench pattern 140B.

The common electrode 108 and the pixel electrode 118 are formed in the second insulating layer 115B and do not protrude from the surface of the second insulating layer 115B. That is, the pixel electrode 118 and the common electrode 108 are on the same level with an upper surface of the second insulating layer 15B.

As the result, a rubbing scratch can be minimized or prevented, thereby improving the image qualities including the contrast ratio.

The lift-off process removes a material deposited on a photosensitive material at undesired regions. In this embodiment, a conductive metal material such as the third conductive layer is deposited on a photosensitive material such as the second photosensitive film layer, and the photosensitive material is then immersed in a solution such as a stripper in order to remove the photosensitive material and the conductive metal material deposited on the photosensitive material. Ultrasonic waves may be applied to the stripper solution to promote the lift-off process.

To complete the LCD device, the array substrate is attached to a color filter substrate using a sealant formed at an outer periphery of an image display region. The array substrate and the color filter substrate are attached to each other by an attachment key formed on the array substrate and the color filter substrate.

Before attaching the array substrate and the color filter substrate to each other, alignment layers are formed on the array substrate and the color filter substrate and a rubbing process is performed to provide the molecules of the alignment layers with a surface fixing force (a pre-tilt angle) and an alignment direction.

The principles of the present invention can be applied to a polycrystalline TFT-LCD as well as other types of display devices such as organic light emitting diodes (OLED).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
    providing a first substrate and a second substrate;
    forming a gate electrode, a gate electrode line and a common electrode line on the first substrate;
    forming a first insulating layer on the gate electrode;
    forming an active layer and source/drain electrodes on the first insulating layer;
    forming a second insulating layer on the source/drain electrodes;
    forming a photosensitive film on the second insulating layer;
    forming a photosensitive film pattern by patterning the photosensitive film;
    selectively removing a part of the second insulating layer by using the photosensitive film pattern to form a plurality of trench patterns in the second insulating layer;
    forming a conductive layer on the photosensitive film pattern and in the plurality of trench patterns;
    removing the photosensitive film pattern and a part of the conductive layer formed thereon, to form a pixel electrode electrically connected to the drain electrode and a common electrode electrically connected to the common electrode line;
    forming a liquid crystal layer between the first and second substrates; and
    attaching the first substrate to the second substrate.

2. The method of claim 1, wherein the plurality of trench patterns include a first trench pattern for connecting the pixel electrode to the drain electrode, a second trench pattern for connecting the common electrode to the common electrode line, and other trench patterns in the second insulating layer to form the pixel electrode and the common electrode.

3. The method of claim 1, further comprising:
    forming a color filter layer on the second substrate,
    forming an alignment layer on the first and second substrate.

4. The method of claim 1, wherein the pixel electrode and the common electrode are alternately arranged.

5. The method of claim 1, wherein the pixel electrode and the common electrode includes one of indium-tin-oxide and indium-zinc-oxide.

6. The method of claim 1, wherein the photosensitive film pattern and the conductive layer formed on the photosensitive film pattern are removed by a lift-off process.

7. The method of claim 6, wherein in the lift-off process, the photosensitive film pattern is removed by a stripper and ultrasonic wave.

8. The method of claim 1, wherein the common electrode and the pixel electrode are on the same level with an upper surface of the second insulating layer so that a rubbing scratch can be minimized or prevented.

9. The method of claim 1, wherein the active layer, the source electrode and the drain electrode are formed by one mask process.

10. The method of claim 1, wherein the plurality of the trench patterns, the pixel electrode and common electrode are formed by one mask process.

11. A liquid crystal display (LCD) device, comprising:
    a first substrate and a second substrate;
    a gate electrode, a gate electrode line and a common electrode line formed on the first substrate;
    a first insulating layer on the gate electrode;
    an active layer on the first insulating layer;
    source/drain electrodes over the gate electrode;
    a second insulating layer formed over the first substrate;

a plurality of trench patterns formed in the second insulating layer;

a pixel electrode and a common electrode in the plurality of trench patterns, wherein the plurality of trench patterns include a first trench pattern for connecting the pixel electrode to the drain electrode, a second trench pattern for connecting the common electrode to the common electrode line, and other trench patterns in the second insulating layer to form the pixel electrode and the common electrode and wherein the common electrode and the pixel electrode are on the same level with an upper surface of the second insulating layer so that a rubbing scratch can be minimized or prevented; and a liquid crystal layer formed between the first and second substrates.

12. The LCD device of claim 11, wherein the pixel electrode and the common electrode are alternately arranged.

13. The LCD device of claim 11, wherein the pixel electrode and the common electrode are formed of indium-tin-oxide or indium-zinc-oxide.

14. The LCD device of claim 11, wherein the plurality of the trench patterns, the pixel electrode and common electrodes are formed by one mask.

15. The LCD device of claim 11, further comprising an alignment layer formed on each facing surface of the first substrate and the second substrate.

* * * * *